L. ROEHR.

MACHINE FOR WELDING CHAIN LINKS.

APPLICATION FILED DEC. 28, 1911.

Reissued Feb. 20, 1912.

13,371.

4 SHEETS—SHEET 1.

WITNESSES

E. J. Nottingham

G. F. Downing

INVENTOR

L. Roehr

By H. A. Seymour

Attorney

COLUMBIA PLANOGRAPH CO., WASHINGTON, D. C.

L. ROEHR.

MACHINE FOR WELDING CHAIN LINKS.

APPLICATION FILED DEC. 28, 1911.

Reissued Feb. 20, 1912.

13,371.

4 SHEETS—SHEET 2.

WITNESSES
E. Nottingham
G. F. Downing.

INVENTOR
L. Roehr
By H. A. Seymour
Attorney

COLUMBIA PLANOGRAPH CO., WASHINGTON, D. C.

L. ROEHR.

MACHINE FOR WELDING CHAIN LINKS.

APPLICATION FILED DEC. 28, 1911.

Reissued Feb. 20, 1912.

13,371.

4 SHEETS—SHEET 3.

WITNESSES

E. J. Nottingham

G. F. Downing.

INVENTOR

L. Roehr

By N. A. Seymour

Attorney

COLUMBIA PLANOGRAPH CO., WASHINGTON, D. C.

L. ROEHR.

MACHINE FOR WELDING CHAIN LINKS.

APPLICATION FILED DEC. 28, 1911.

Reissued Feb. 20, 1912.

13,371.

4 SHEETS—SHEET 4.

WITNESSES

E. J. Nottingham

G. F. Downing

INVENTOR

L. Roehr

By H. A. Seymour

Attorney

COLUMBIA PLANOGRAPH CO., WASHINGTON, D. C.

UNITED STATES PATENT OFFICE.

LOUIS ROEHR, OF STAMFORD, CONNECTICUT, ASSIGNOR TO THE YALE & TOWNE MANUFACTURING COMPANY, OF STAMFORD, CONNECTICUT.

MACHINE FOR WELDING CHAIN-LINKS.

13,371. Specification of Reissued Letters Patent. Reissued Feb. 20, 1912.

Original No. 858,758, dated July 2, 1907, Serial No. 354,115. Application for reissue filed December 28, 1911. Serial No. 668,301.

*To all whom it may concern:*

Be it known that I, LOUIS ROEHR, of Stamford, in the county of Fairfield and State of Connecticut, have invented certain new and useful Improvements in Machines for Welding Chain-Links; and I do hereby declare the following to be a full, clear, and exact description of the invention, such as will enable others skilled in the art to which it appertains to make and use the same.

My invention relates to an improvement in machines for welding chain links, and is designed as an improvement on the machine and method disclosed in Patent 829,295, granted to The Yale & Towne Manufacturing Co., August 21st, 1906. In the machine disclosed in the patent above referred to the link being welded is clamped in a rocking support, and the latter is rocked during the welding operation thus producing a weld without projecting fins. In some types of chains, where the gage of the chain or the length of the link is not sufficient, this working of the link is impracticable, and the object of this invention is to provide a machine whereby the links may be welded and the fins formed during the operation, be removed before the completion of said operation, without rocking or otherwise moving the link, and my invention consists of the parts and combinations of parts as will be more fully hereinafter described and pointed out in the claims.

Figure 1:
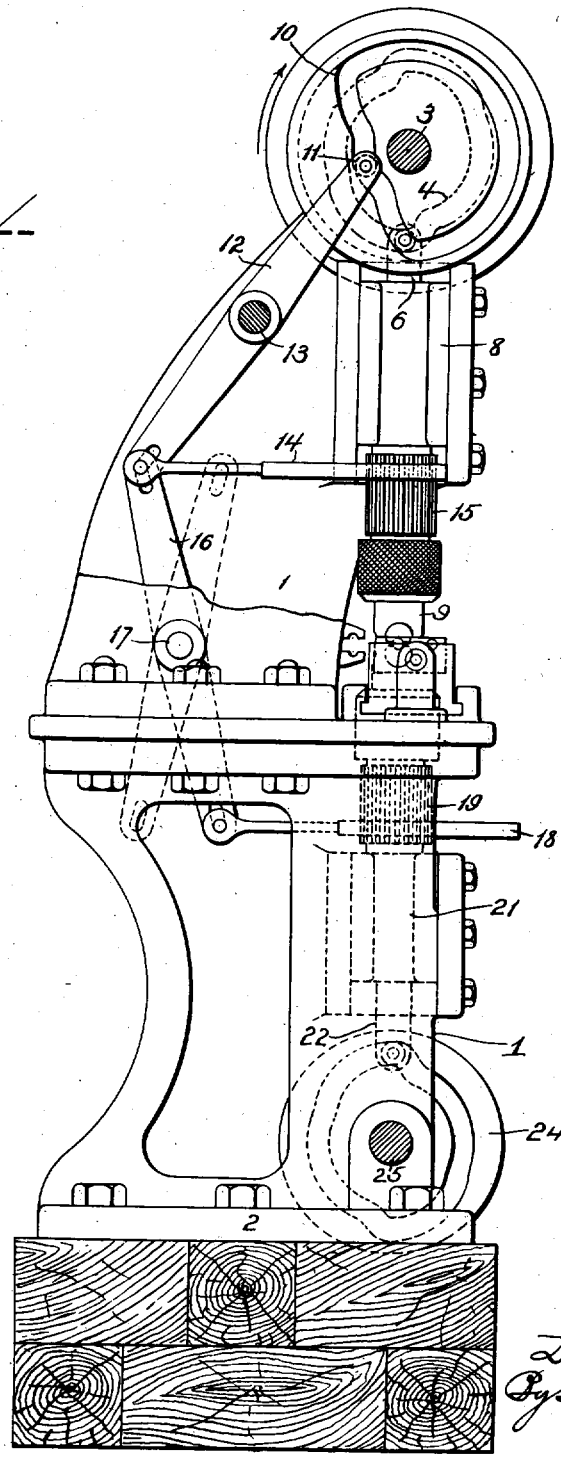
Figure 2:
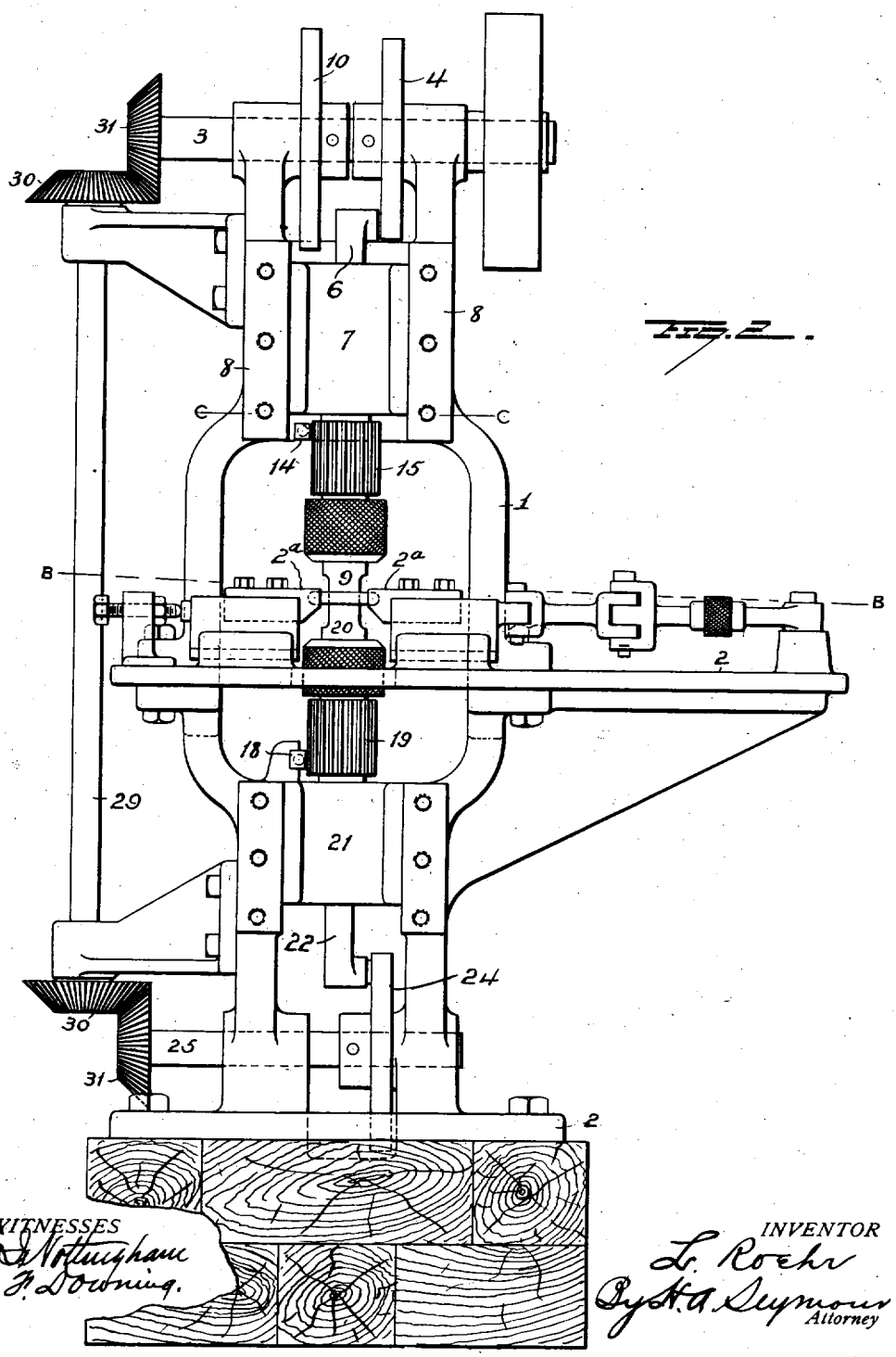
Figure 3:
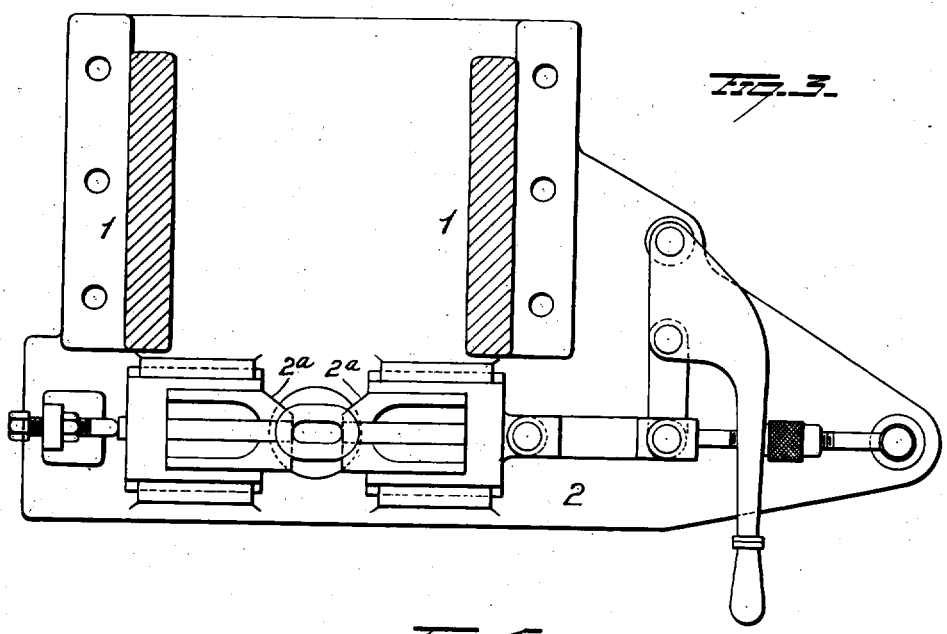
Figure 4:
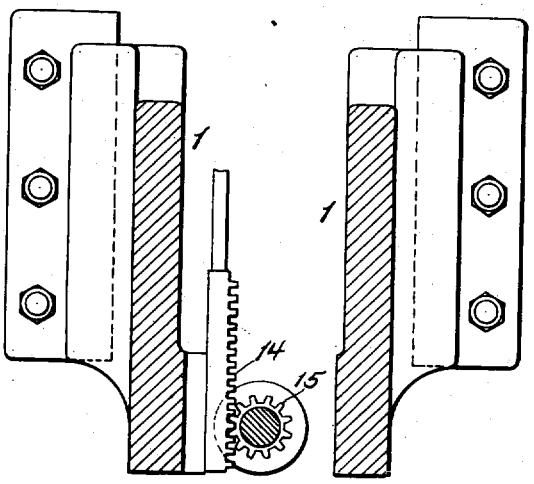
Figure 5:
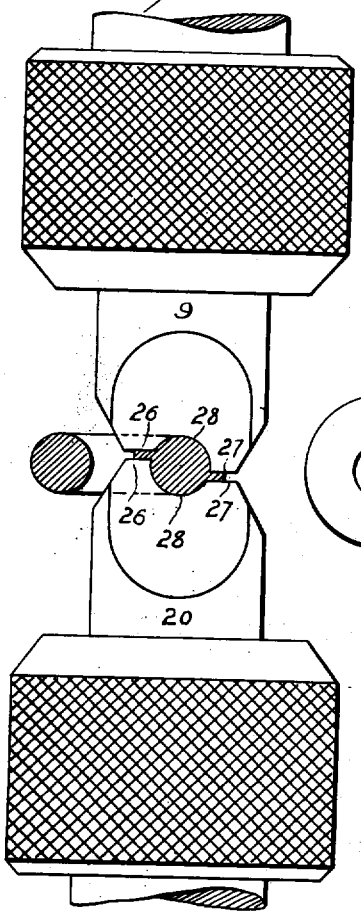
Figure 6:
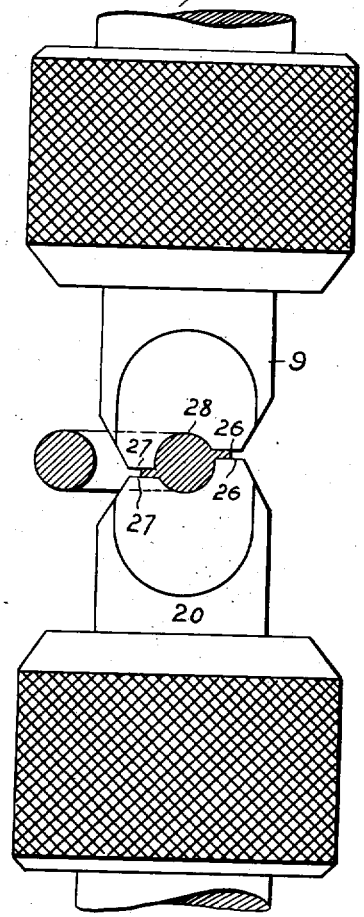

In the accompanying drawings, Figure 1 is a view in side elevation of a machine embodying my invention, a part of the frame being broken away to show the operating mechanism. Fig. 2 is a view in front elevation, the lever arms which actuate the rack bars being omitted. Fig. 3 is a view in section on the line B B of Fig. 2, showing simply the frame of the machine and the clamp thereon. Fig. 4 is a view in section on the line C C of Fig. 2 showing parts of the frame and the rack bar engaging the pinion of the upper die. Figs. 5 and 6 are two views in elevation showing the two positions of the dies and Figs. 7, 8, 9, 10 and 11 are each a view in elevation and transverse section showing, the link in its several stages, from the time it is clamped in the machine to the completion of the welding operation.

1 represents a frame of any suitable design provided at its base with flanges by which it is secured to a suitable support. This frame is provided about midway its length with a table 2 carrying the clamps $2^a$ by which the links are held in place during the welding operation. This frame 1, carries at its upper end the main shaft 3 to which the cam 4 is secured.

Actuated by the cam 4 is the arm 6, which through the operation of the cam moves up and down and carries with it the cross-head 7. This cross head 7 is mounted to move vertically in guideways 8 on frame 1 and carries at its lower end the die 9, the latter being mounted in the cross head so that it can be revolved. The die can be mounted directly in the cross head, or it can be detachably secured to a rotary holder carried by the cross head. The revolution of the die is accomplished by means of the cam 10 secured to shaft 3, and engaged by the cam roller 11 on the upper end of lever 12. This lever is pivoted to frame 1 at 13, and is connected at its lower end to the rack bar 14 which latter is supported and guided in its movements by suitable guides at the sides of the frame 1. This rack bar meshes with the pinion 15 fast on the rotary die holder or stem of the die 9 as the case may be.

Connected to the lower end of lever 12 is the lever 16 pivoted at 17, and connected at its lower end to the rack bar 18, which is in mesh with pinion 19 fast to the die 20 or die holder. This die holder or stem is mounted to rotate in a cross head 21, similar to the cross head 7, and which is mounted to move in the portion of the frame below the table 2, and this cross head 21 is connected by the arm 22 with the cam 24 on shaft 25, the latter being mounted near the base of the frame 1, and connected up with shaft 3 by shaft 29 and pinions 30 and 31, so as to rotate in unison therewith.

By referring to Figs. 5 and 6 it will be seen that each of the dies is provided with two flat faces 26 and 27 located in different planes, which faces will hereinafter be designated as high and low faces. Between the high and low faces of each die, is a curved face 28 conforming to the size of the link being operated upon. When the dies are brought together as shown, say in Fig. 5, two fins are produced as therein indicated, one being above and the other below the horizontal center of the link. When the dies, are turned 180 degrees, as they are in the operation of the machine, the relation of the high and low faces on the upper and lower dies or hammer and anvil will be changed as shown in Fig. 6 and it is evident that the tendency of this change in the faces is to fold in the fins produced by the first squeeze or blow, or cut them off, and by a second or more turns of the dies, or hammer and anvil a perfect and smooth weld is produced.

Figure 7:
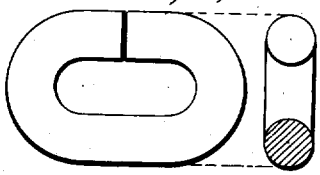
Figure 8:
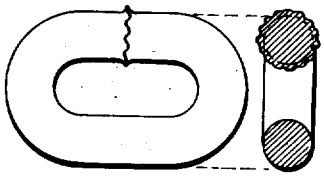
Figure 9:
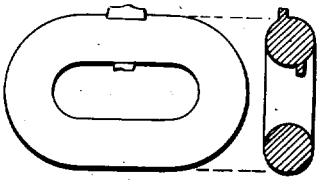
Figure 10:
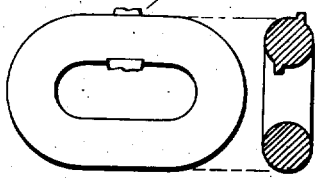
Figure 11:
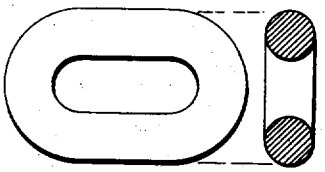

In the operation of the device the link shown in Fig. 7 to be welded, is placed within a clamp of any preferred form with the joint in a plane with the dies. The welding heat is produced by electricity, or by any proper means, and while in its heated condition and clamped, the two abutting ends of the link are forced into contact producing the bulge shown in Fig. 8, and the link is in this condition prior to the first stroke of the dies. After the first stroke, a fin is formed on one side between the high faces of the dies and on the other side by the low faces, thus producing two fins in different horizontal planes. The parts will then be in condition and position as shown in Fig. 5. If shaft 3 be now revolved in the direction of the arrow, it will first operate to elevate the upper die and lower the lower die until the surfaces of the dies are clear of the link. As soon as the eccentricity of the cam 10 begins to act on roller 11, it will move the lower end of the lever 12 to the right and the lower end of lever 16 to the left, thus causing rack bar 14 which is connected to the lower end of lever 12 and the rack bar 18, connected to the lower end of lever 16, to rotate their respective pinions half a revolution or 180 degrees in opposite directions, thus bringing the high face on the lower die under the low fin and the low face under the higher fin. These rotary movements of the dies occur when the latter are out of contact with the link, and after the dies have been thus rotated, they are again forced toward each other, the changed positions of the high and low faces on the dies operating to fold in or cut off the fins, so that after two or more blows or squeeze, as the case may be, a perfect weld without any fins results.

While I have shown the improvement in connection with a press, it will be clearly evident that a hammer and anvil will produce precisely the same result, hence I would have it understood that the use of the term dies is intended to include hammer and anvil or any equivalent mechanism that will produce the result attained by the mechanism shown. Again while I have described the improvement in connection with a link welding machine, it is equally applicable to welding straight bars.

It is evident that many slight changes might be resorted to in the relative arrangement of parts shown and described without departing from the spirit and scope of my invention hence I would have it understood that I do not wish to confine myself to the exact construction of parts shown and described, but, Having fully described my invention what I claim as new and desire to secure by Letters-Patent, is:

1. In a machine for welding, the combination with means for holding the members to be welded, of two dies located to operate against opposite sides of the members being welded, each die having a recessed section and high and low faces the latter being on opposite sides of the recessed sections, the high and low faces of one die coacting respectively with the high and low faces of the other die and means for moving the dies toward and from each other and means for partly rotating them.

2. In a machine for welding, the combination with means for holding the members to be welded, of two dies located to operate against opposite sides of said members, each die having a recess, and high and low faces, the high and low faces of each die coacting respectively with the high and low faces of the other die, means for moving the dies toward and away from each other and means for partly rotating each die.

3. In a machine for welding, the combination with means for holding the members to be welded, of two dies located to operate against opposite sides of said members, each die having a recess and high and low faces, the high face of each die being normally in line with the high face of the other die, and the low face of one die being normally in line with the low face of the other die, means for moving the dies toward and away from each other, and means for simultaneously rotating both dies half a revolution in opposite directions.

4. In a machine for welding, the combination with means for holding the members to be welded, of two welding tools each having a recess and high and low faces whereby the fins formed by the compression of the members between the tools will be in different planes, and means for reversing the position of the high and low faces on the welding tools whereby the fins formed on the members by the first compression will be folded in or cut off by subsequent compressions.

5. In a machine for welding, the combination with means for holding the members to be welded, of two welding tools each having a recess and high and low faces, the high and low faces on one tool being normally opposite the high and low face on the other, means for moving said tools toward and away from each other, and means for reversing the positions of the high and low faces, whereby the fins formed on the members by the first compression will be folded in or cut off by subsequent compression.

In testimony whereof, I have signed this specification in the presence of two subscribing witnesses.

LOUIS ROEHR.

Witnesses:
S. C. WHITNEY,
J. C. REGAN.

Copies of this patent may be obtained for five cents each, by addressing the "Commissioner of Patents, Washington, D. C."